Jan. 24, 1967  M. W. WATTS  3,300,171
QUICK-RELEASE HOLD-DOWN DEVICE
Filed April 14, 1965  2 Sheets-Sheet 2
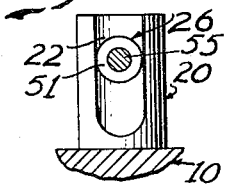
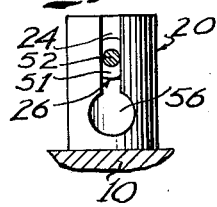
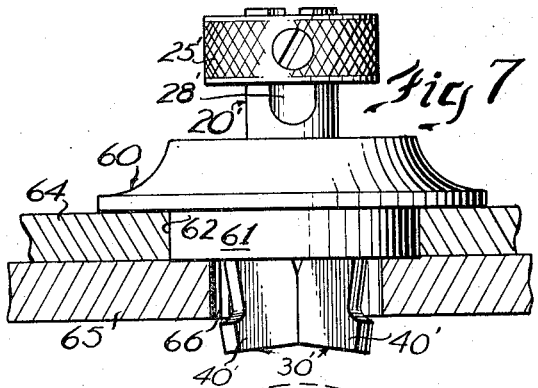
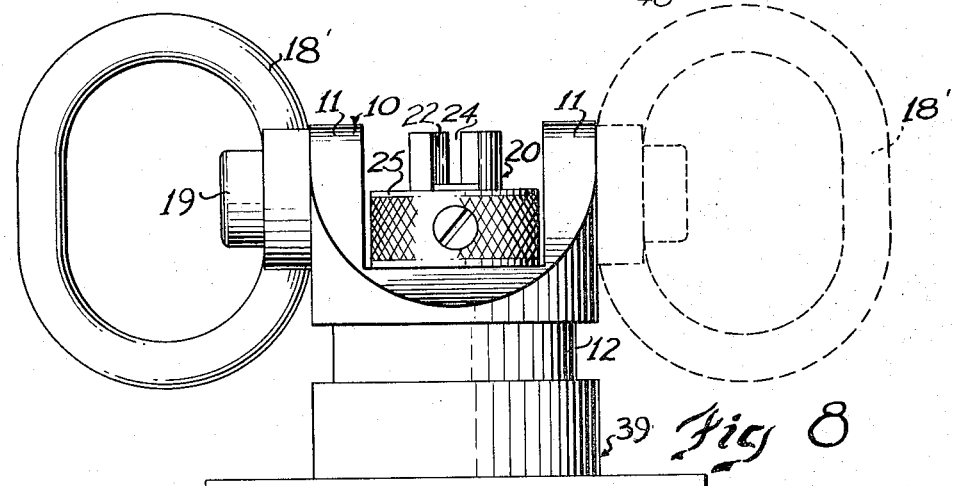
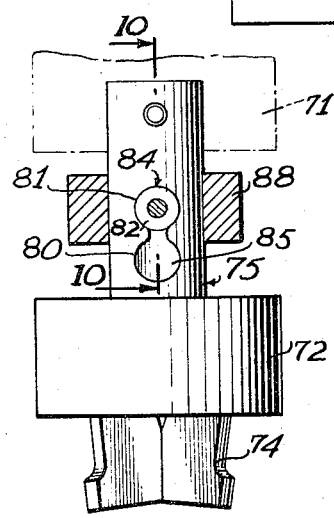
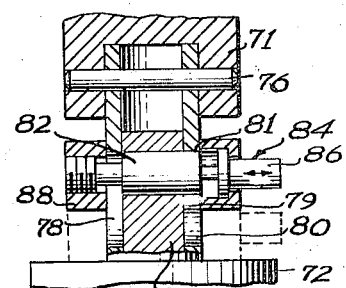
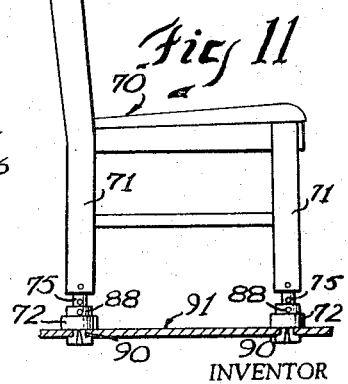
INVENTOR
MAX WELTON WATTS
BY Newton, Hopkins, Jones & Ormsby
ATTORNEYS

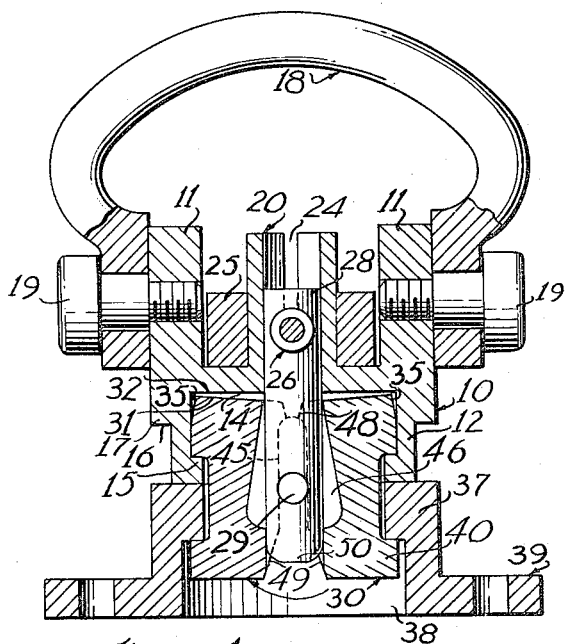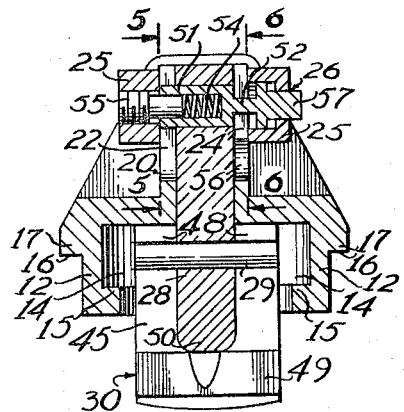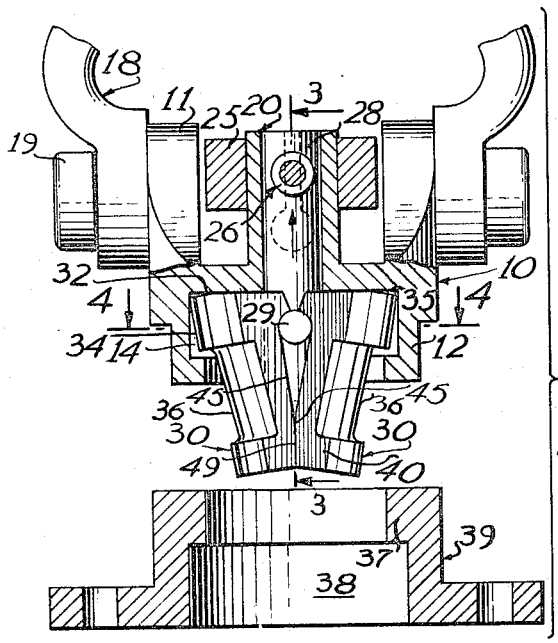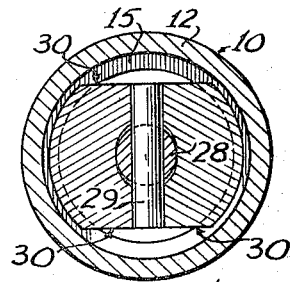

United States Patent Office 3,300,171
Patented Jan. 24, 1967

3,300,171
QUICK-RELEASE HOLD-DOWN DEVICE
Max Welton Watts, Clayton, Ga., assignor to The Aid Corporation, Clayton, Ga., a corporation of Georgia
Filed Apr. 14, 1965, Ser. No. 448,133
8 Claims. (Cl. 248—361)

This invention relates generally to securing devices and more particularly to a quick release hold-down device that includes a member which is readily movable into and from engaging position, together with means for preventing the inadvertent release thereof.

The present invention provides a sturdy and durable hold-down device of such substantial strength and proportions as to be appropriate for the securement of heavy cables, chains, machine parts and rigging. The present structure is of such design that the device not only can withstand substantial forces applied, but also will withstand the effect of vibration and relative movement between the respective parts. Nevertheless, the device is simple in construction, adapted for easy manual operation and designed to meet the demands of economic manufacture.

In general terms, the present form of the invention may be broadly defined as including a generally cylindrical anchoring member pivotally housing the ends of a pair of rigid clamping arms that provide the securing terminals, together with a reciprocating shank within the housing which, upon movement, spreads or retracts the securing terminals of the clamping arms. A simple manually operable securing pin may lock the shank in engaged position to preclude inadvertent or unauthorized release of the device.

Thus, it will be seen that it is among general objects of the invention to provide a novel, simple and improved hold-down device designed for quick release while providing for the preclusion of inadvertent release.

A further object of the invention is to provide a rigid and durable hold-down device adapted to retain members rigidly in predetermined engaged relationship, and to withstand rugged usage and great stresses.

Another object of the invention is to provide a device of the character set forth which may be manually manipulated for engagement and disengagement, which does not tend to release under stress, and which may be readily locked in secured position.

These and numerous other objects, features, and advantages of the present invention will become apparent from consideration of the following specification taken in conjunction with the accompanying drawings wherein like characters of reference designate corresponding parts throughout and in which:

FIG. 1 is a partial vertical section of one form of the present invention shown with the parts in engaged position;

FIG. 2 is a view similar to FIG. 1, partially broken away, with the parts shown in released position;

FIG. 3 is a vertical sectional view taken along line 3—3 of FIG. 2;

FIG. 4 is a horizontal sectional view taken along line 4—4 of FIG. 2;

FIG. 5 is a fragmentary cross-sectional view taken substantially along the line 5—5 in FIG. 3;

FIG. 6 is a view similar to FIG. 5, taken substantially along the line 6—6 of FIG. 3;

FIG. 7 is a side elevational view of a form of the invention to be used in connecting parallel plate sections;

FIG. 8 is a side elevational view of a modification of the invention shown in FIG. 1 provided with an attaching bail attached to one of the mounting ears, and having a second bail, shown in broken lines, that may be attached to the other mounting ear;

FIG. 9 is a side elevational view of a modified form of the present invention which can be used in securing a chair or the like to a plate or deck;

FIG. 10 is a vertical cross-sectional view taken along the line 10—10 of FIG. 9; and FIG. 11 is a side elevational view of a chair secured by the device shown in FIGS. 9 and 10.

Referring now to that form of the invention shown in FIGS. 1 through 6 of the drawings, it will be seen that the body 10 of the device is substantially cylindrical. The body 10 in this presentation of the inventive concept is formed with upstanding, opposed bail bracket ears 11 and a depending cylindrical skirt 12 defining an internal cylindrical chamber 14, the skirt 12 terminating at its lower edge in an inwardly extending confining lip 15. Externally, the skirt 12 may be reduced as at 16 to provide a shoulder 17. To accommodate cables, chains, lines, or like rigging gear, the ears 11 are provided with a bail 18 extending therebetween and pivotally mounted against the outer faces of the ears by threaded bolts 19.

Centrally of the body 10 and between the ears 11, there is an upwardly extending guide cylinder 20 with diametrically opposed, broad and narrow, vertical lock slots 22 and 24 respectively. Slidably mounted over the guide cylinder 20 is an externally knurled actuating nut 25. Transversely through the nut 25 and the slots 22 and 24 there extends an actuating pin assembly 26, the detailed structure and arrangement of which will be hereinafter discussed. The pin assembly 26 extends through the upper end of a generally cylindrical operating shank 28; and, through the lower end of the shank 28, there extends a transverse actuating bar 29 for controlling the pivotal movement of a pair of opposed, generally semi-cylindrical clamping arms 30.

Each semi-cylindrical arm 30 includes a flat upper end surface 31 slightly inclined downwardly toward the central axis of the arm so that in the inwardly pivoted, or retracted, position of the arms 30 as seen in FIG. 2, the surfaces 31 of the arms will bear against the flat, internal top surface 32 of the chamber 14. To conform to the right angular realtion of the side wall 34 of the chamber 14, the mid portions of the top edges of the arms 30 are beveled as at 35 so that the top, outer corners of each arm 30 can seat securely in the top peripheral corner of the chamber 14 which is formed between the top surface 32 and the side wall 34. Such seating not only constitutes a part of the stop arrangement, limiting retraction of the arms, but also assists in precluding looseness of fit and consequent vibration and chatter. Intermediate the upper and lower ends of the arms 30, the sides of the arms are circumferentially recessed as at 36 to accommodate the inwardly extending walls, or flanges, of a member to which the devices are to be secured, such as the inwardly extending top lip 37 above the cavity 38 of an anchoring member 39 as shown in FIGS. 1 and 2. Such recessing as at 36 defines the arcuately protruding retaining extremities or lugs 40 of the arms 30.

The upper ends of the side recesses 36 of each arm 30 defines the under surface of an outwardly protruding circumferential pivot flange 42. The vertical inner faces of the arms 30 present intermediate, flat vertical surfaces 45 that are substantially parallel to the outer surfaces of the recesses 36. Centrally, each inner surface 45 is formed with a vertical groove 46 which extends through an inner edge bead 48 at the upper end of each arm, and merges at its lower end with the downwardly and outwardly inclined lower, terminal walls 49 at the lower end of the internal surfaces of the arms 30.

This construction and arrangement is such that, as more clearly shown in FIG. 2, when the arms 30 are in retracted, or inoperative position, the actuating bar 29 will be between the arms at the upper ends of the flat surface 45 and will be bearing against the underface of the inner edge beads 48 of the arms 30. In its upward movement from operative position, as hereinafter referred to, the engagement of the actuating bar 29 with the beads 48 has caused the pivotal movement of the arms 30 to the released position shown in FIG. 2. It will be noted that in this position the lower terminal walls 29 are in contact, and the upper surfaces 31 of the arms 30 are engaged with the internal top surface 32 of the chamber 14, thus providing a vibration-free location of parts within the body 10.

From the released or non-engaged position of the arms shown in FIG. 2 it will be seen that, upon depression of the actuating nut 25 inwardly towards the body 12, the pin assembly 26 will move the operating shank 28 downwardly through the chamber 14 and, in such movement, the actuating bar 29, in co-operation with the rounded lower end 50 of shank 28, will spread the arms chamber 14. In such movement the end 50 will engage the lower portion of the vertical groove 46 to force the arms 30 apart; and, concurrently therewith, the actuating bar 29 will be engaging the surfaces 45. The arms 30 are thus forced apart so that the surfaces 45 have assumed the parallel relation indicated in FIG. 1, with the actuating bar 29 therebetween and with the end 50 of the shank 28 forcing the lower terminal walls 49 outwardly. In such outwardly spread position, it will be seen from FIG. 1 that the surfaces 44 of the upper ends of the arms 30 lie against and are in flat contact with the inner wall 34 of the chamber 14. Thus, it will be seen that the shank 28, in its fully downward position, along with transverse actuating bar 29 will retain the arms 30 in fully spread or engaged position below the top lip 37 of the anchoring member 39 with the lugs 40 engaging the under surface thereof to secure the hold-down device.

With respect to the transversely extending actuating pin assembly 26, attention is directed to FIGS. 3, 5, and 6. It will be seen that the pin assembly 26 is of compound construction including a central hollow body 51 extending transversely through the shaft 28 and has an outwardly projecting smaller diameter pin 52 integral therewith and extending through the nut 25. The extending end of the pin 52 is integral with a button 57. The hollow body 51 receives a spring 54, one end of which bears against the inner end of the hollow body 51 and the opposite end of which bears against a set screw 55, the set screw 55 being threaded through the nut 25; therefore, the spring 54 normally urges the body 51 toward the right in FIG. 3. Such movement is, however, restrained by the narrower slot 24 when the nut 25 and the shank 28 are in upper position as in FIGS. 2, 3, and 6, since the narrow character of the slot 24 freely receives the pin 52 at its upper end, but will not receive the wider body 51. The wider slot 22 in the guide cylinder is of uniform width throughout its length, and is sufficiently wide to receive the body 51 freely, throughout the entire travel of the shank 28 and the nut 25. The narrow slot 24, however, is formed at its lower end, as best seen in FIG. 6, with an enlarged, or key-hole, opening 56 which will receive the body 51 when the shank 28 is in the lowermost position and the pin assembly 26 is in registration with the enlarged opening 56. Thus, when the legs 40 are moved outwardly by downward movement of nut 25 and shank 28, the spring 54 will automatically move the body 51 into the opening 56. The pin assembly 26 then will be retained by the opening 56 to lock the members 30 in engaged position until the slidable button 57, which is in the nut 25 opposite the set screw 55, is pressed inwardly, manually to body 51 from the opening 56, thereby permitting the nut 25 to raise the shank 28. Since such release requires manual manipulation, it will be seen that the device will not be released by inadvertence, accident, or substantial vibration of the device.

The versatility of the present inventive concept is exemplified in FIGS. 7 to 11, inclusive. In the embodiment of the invention shown in FIG. 7, only the body 60 differs from the body 10 of FIG. 1 in that it is formed with an integral retaining plate with a protruding circular base 61, the base 61 being adapted to be received through an aperture 62 in an upper plate 64 that is sought to be joined to a lower plate 65. In this arrangement, the aperture 62 in the upper plate 64 is positioned in registration with a smaller aperture 66 in the lower plate 65. With the body 60 positioned above the upper plate 64 so that the base 61 protrudes into the aperture 62, the expansion of the arms 30' of the device by movement of the nut 25' and the shaft 28' along the guide cylinder 20' will cause the lugs 40' of the arms 30' to engage the under face of the lower plate 65 to unite the plates 64 and 65 between the lugs 40' and the body 60 as shown. The arms 30', the nut 25' and the shaft 28' are identical to their corresponding components of FIG. 1.

FIG. 8 shows an alternate bail arrangement to be used with the body 10 by attaching individual bails 18' to one or both brackets 11. This allows the rigging associated with the hold-down device to be separated for easier removal without entanglement of the rigging.

In FIGS. 9, 10, and 11, the hold-down device of the present invention has been modified to illustrate its adaptability as a securing means for furniture or like objects. Thus, a chair 70 may have its legs 71 fitted with hold-down devices of the invention in which the body 72 is formed substantially as the body 10 without the ears 11 of FIGS. 1 to 4. Within the body 72 there are located pivotal arms 74 similar in character and function to the arms 30. In this embodiment of the invention however, cylinder 75, which is a counterpart of the cylinder 20 of FIGS. 1 to 4, extends upwardly to be received in and secured to the legs 71 by transverse pins 76 or any appropriate equivalent.

The cylinder 75 is provided with a wide slot 78 extending along one side, the slot 78 corresponding to the slot 22 shown in FIG. 5; and, there is a narrow slot 79 located diametrically opposite the wide slot 78. The narrow slot 79 corresponds to the slot 24 shown in FIG. 6 and has an enlarged opening 80 at its lower end which corresponds to the opening 56 of FIG. 6. The slot 79 also has an enlarged opening 81 at its upper end the opening 81 being identical in size to the opening 80. This allows the hollow body 82 of the pin assembly 84 of FIG. 3 to extend into the openings 80 and 81 to lock the shaft 85, corresponding to the shaft 28 of FIG. 1, in an upper and lower position. In the upper position the arms 74 are in their collapsed or released position, and in the lower position the arms 74 are in their expanded or engaged position. Depressing a slidable button 86 extending from a nut 88 which carries the pin assembly 84 allows the shaft 85 and nut 88 to be moved from the upper to the lower position since the smaller pin 89 of the pin assembly 84 is in registration with the slot 79 as explained for the first embodiment of the invention. Thus, by placing the arms 74 through appropriate apertures 90 of a deck 91 or the like, furniture or the like will be retained in a fixed position, moreover, the inadvertent engaging or releasing of this embodiment of the hold-down device is prevented.

From the foregoing, it will be apparent that the inventive concept presents a novel, improved, rugged, and durable hold-down device, simple in operation and economic in manufacture. The structural details are herein presented by way of suggestion as one successful application of the invention. As hereinabove pointed out, numerous changes, modifications, and the full use of equivalents may be resorted to in the practice of the invention without departing from the spirit or scope of the invention as outlined in the appended claims.

What is claimed as invention is:

1. A hold down device including a body defining an internal cylindrical chamber having an opening through the bottom of the body, a pair of identical semi-cylindrical arms pivotally engaged within said chamber and extending through the open bottom of said chamber, protruding retaining lugs on said arms externally of said body, means movable with respect to said body to pivotally move said arms to extend and retract said lugs, said means including an axially movable operating shank movable between said arms, and means for manually moving said shank and for releasably securing said shank in fixed position.

2. In a device of the character described, a pair of opposed semi-cylindrical arms, means for pivotally mounting said arms, retaining lugs protruding from the ends of said arms, a shank mounted for relative movement between said arms for pivotally moving said arms in response to movement of said shank, said arms including confronting flat surfaces engageable to limit the pivotal movement thereof in one direction and opposed faces limiting pivotal movement of the arms in an opposite direction, said means providing a bearing for slidable movement of said shank, and means for releasably securing said shank in fixed position.

3. A hold down device including a body defining an internal, cylindrical, walled chamber having a flat upper surface, and a pair of hold down arms including ends fitted within said chamber for pivotal movement therein, each arm including at least one surface engageable with said flat upper surface of said chamber when in one extreme position.

4. A hold down device including a body defining an internal, cylindrical, walled chamber having a flat upper surface, a pair of hold down arms including ends fitted within said chamber for pivotal movement therein, response to pivotal movement of the arms, each arm including at least one surface engageable with said flat upper surface of said chamber when in one extreme pivotal position, and at least one surface engageable with the wall of said chamber when in the other extreme pivotal position whereby such engagements limit the extent of pivotal movement of said arms.

5. A hold down device including a body defining an internal, cylindrical, walled chamber having a flat upper surface, a pair of hold down arms including ends fitted within said chamber for pivotal movement therein, each arm including at least one surface engageable with said flat upper surface of said chamber when in one extreme pivotal position, and at least one surface engageable with the wall of said chamber when in the other extreme pivotal position whereby such engagements limit the pivotal movement of said arms, and reciprocating means mounted in said body for moving said arms from one extreme pivotal position to the other.

6. A hold down device including a body defining an internal, cylindrical, walled chamber having a flat upper surface, a pair of hold down arms including ends fitted within said chamber for pivotal movement therein in response to pivotal movement of the arms, each arm including a flat internal surface engageable with a like surface of the other arm and at least one surface engageable with said flat upper surface of said chamber when in one extreme pivotal position, together with a flat surface engageable with the wall of said chamber when in the other extreme pivotal position whereby such engagement limits the pivotal movement of said arms, and reciprocating means for moving said arms from one extreme pivotal position to the other, said reciprocating means including an axially movable shank mounted in said body, movably mounted in said body and engageable between said arms for controlling the pivotal movement thereof, and means for securing said shank against inadvertent displacement.

7. A hold-down device including a body defining an internal cylindrical walled chamber having a flat upper surface, a pair of hold-down arms including ends fitted within said chamber for pivotal movement therein in response to pivotal movement of the arms, each arm including a flat internal surface engageable with a like surface of the other arm and at least one surface engageable with said flat upper surface of said chamber when in one extreme pivotal position together with a flat surface engageable with the wall of said chamber when in the other extreme pivotal position whereby such engagement limits the pivotal movement of said arms, and reciprocating means for moving said arms from one extreme pivotal position to the other, said reciprocating means comprising a movable shank slidably mounted in said body and slidable between said arms so that movement of the shank between said arms controls their pivotal movement, and means for securing said shank against inadvertent displacement.

8. A hold-down device including a body defining an internal cylindrical walled chamber having a flat upper surface, a pair of hold-down arms including ends fitted within said chamber for pivotal movement therein in response to pivotal movement of the arms, each arm including a flat internal lower surface having a tapered groove therein, said surface engageable with a like surface of the other arm, at least one top surface engageable with said flat upper surface of said chamber when in one extreme pivotal position, and an arcuate internal upper surface engageable with a like surface of the other arm to form a receiving surface together with a flat side surface engageable with the wall of said chamber when in the other extreme pivotal position whereby such engagement limits the pivotal movement of said arms, and reciprocating means for moving said arms from one extreme pivotal position to the other, said reciprocating means comprising a movable shank having a tapered lower end receivable within the mouth of the tapered groove of said lower internal surface of each arm, said shank being slidably mounted in said body and slidable between arms so that movement of the shank into said groove and to the down securing position between said arms causes outward pivotal movement of said arms and movement of the shank to the up-release position through said groove permits inward pivotal movement of said arms; a pin transversely passed through said shank for axial movement between said arms and engagement with said receiving surface when said shank is in the up-release position to cause thereby the inward pivotal movement of the arms; and means for securing said shank against inadvertent displacement.

References Cited by the Examiner

UNITED STATES PATENTS 610,308　9/1898　Seaman _____ 85—74

FOREIGN PATENTS 680,411　2/1964　Canada.
531,413　8/1931　Germany.
875,238　8/1961　Great Britain.
454,771　2/1950　Italy.

CLAUDE A. LE ROY, *Primary Examiner.*

J. F. FOSS, *Examiner.*